United States Patent [19]

Amemiya

[11] 4,069,736
[45] Jan. 24, 1978

[54] MUSIC LEARNING DEVICE

[76] Inventor: Toshio Amemiya, 385 Nakami-cho, Akishima, Tokyo, Japan

[21] Appl. No.: 669,911

[22] Filed: Mar. 24, 1976

[30] Foreign Application Priority Data

Apr. 19, 1975 Japan .................................. 50-043672

[51] Int. Cl.² ............................................. G09B 15/02
[52] U.S. Cl. ..................................................... 84/474
[58] Field of Search .................... 84/471.5 R, 474, 473

[56] References Cited

U.S. PATENT DOCUMENTS

| | | | |
|---|---|---|---|
| 1,569,328 | 1/1926 | Logan | 84/474 |
| 1,804,460 | 5/1931 | Cordier | 84/474 |
| 3,592,099 | 7/1971 | Gibby | 84/473 |

FOREIGN PATENT DOCUMENTS 334 of 1874 United Kingdom .................. 84/474

Primary Examiner—Lawrence R. Franklin
Attorney, Agent, or Firm—Carroll F. Palmer

[57] ABSTRACT

A device for learning musical concepts comprises a circular display of musical notes covering at least three octaves, including notes of sharp and flat key-signatures, in adjoining relationship and a plate rotatably attached to said display, said plate having means for indicating musical notes within said display bearing a predetermined angular space relationship to one another.

2 Claims, 8 Drawing Figures

MUSIC LEARNING DEVICE

BACKGROUND OF THE INVENTION

1. Field of the Invention

This invention relates to devices for learning musical concepts. More particularly, it concerns a device for displaying relationships of musical notes in a circle of fifths.

2. Description of the Prior Art

The circle of fifths is conveniently used for learning tone scales and other aspects of music. This circular presentation of musical notes is also called a circle of keys or a circle of scales.

A circle of fifths may be obtained by arranging keys in a circular form. However, it is difficult to arrange such a circle in a full and useful presentation because so many keys must be arranged in a circle, including keys taken both clockwise and counter-clockwise, each with major and minor, so that some overlap with each other. Usually, major and minor keys are arranged in different circles, or separately in double rows.

OBJECTS

A principal object of the present invention is the provision of a circle of fifths compiled in a compact form in a device useful for learning musical concepts.

Another object is the provision of a method of obtaining improvements in the use of circle of fifths for learning music.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects of the invention are attained by forming a circular display of musical notes covering at least three octaves, including notes of sharp and flat signatures, in adjoining relationship and rotatably attaching thereto a plate having means for indicating musical notes within the display bearing a predetermined angular space relationship to one another.

As a perfect fifth corresponds to a seven notes interval, and three or four octaves correspond to 36 or 48 notes respectively, positions may be one note shifted over or under the basic note when they returned to the starting position, so that all keys of clockwise and counter-clockwise can be arranged in a circle, not overlapping but adjoining each other. Thus the major and minor keys can be aligned in a single row, and making a display that is very compact and convenient for use.

Further, I have devised forms of rotating plates to be used conveniently in combination with the display or table of the present invention, some of them having windows or arrow marks for indicating major and minor keys separately, and some plates having means for indicating keys with "#" and "♭" key-signature separately. Some other plates have means for indicating do-re scale with each key, as well as means for indicating number and positions of chromatic signs to be used in the stave.

BRIEF DESCRIPTION OF THE DRAWINGS

A more complete understanding of the new music learning devices of the invention may be had by reference to the accompanying drawings in which.

DESCRIPTION OF PREFERRED EMBODIMENTS

Figure 1:
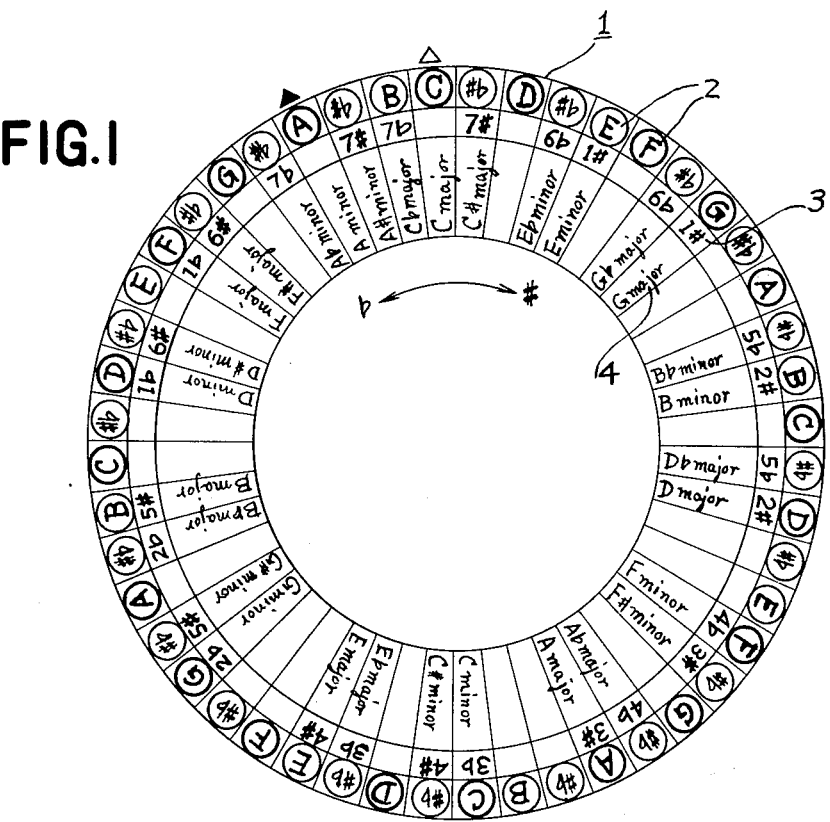
FIG. 1 is a front view of a table of a circle of fifths illustrating one embodiment of the present invention.

Referring now to the drawings, one embodiment of the basic disc 1 shown in FIG. 1 is divided into 48 sectors and each sector is filled with sound notes to form circular arrangement of four octave A-B-C chromatic scale 2, key-signature 3, and corresponding key names 4 from outer to inner part of the sector, each key taking note in scale 2 as key note.

In the scale arrangement 2, chromatic signs "#♭" are used for the derivative notes, and the letter notes having whole tone space to the next ascending letter note are surrounded by thick small circles.

Positions of major keys can be determined by taking notes in the scale 2 every perfect fifth (seven notes space), clockwise and counter-clockwise (indicated by "#" and "♭" signs respectively), starting from "C" marked with "△".

Positions of minor keys can be determined in a similar way, but starting from nearest descending "A" marked with "▲".

The number of chromatic signs in key-signature 3, which is to be used in the stave, can be obtained in relation to the determination of key position, that is, the key taken first has one chromatic sign and so on.

As the four octave twelve notes scale (48 notes) is arranged in the basic disc 1, keys with sharp and flat signatures are arranged very compactly in an adjoining relationship, not overlapping nor spaced apart with each other. Further, basic note "A" for minor keys is disposed nearest descending position from "C", all keys, major and minor, with sharp and flat key-signatures, are aligned in a circle, thus a table of very compact and convenient form for the device is obtained.

Figure 3:
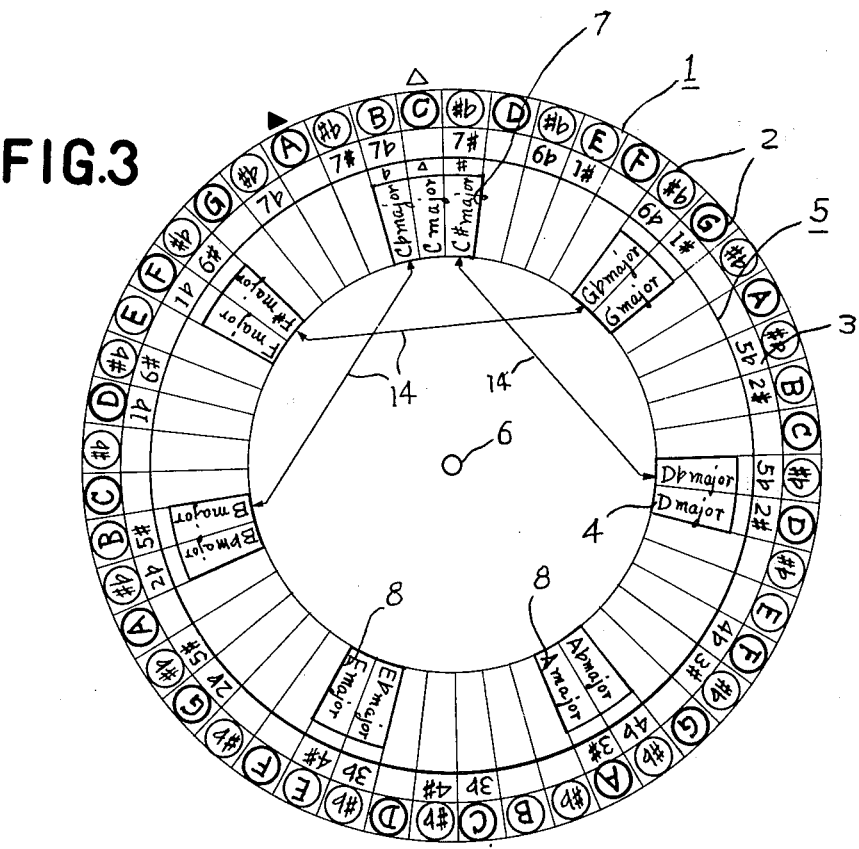
FIG. 3 is a front view of the table shown in FIG. 1 with the rotating plate shown in FIG. 2, FIG. 4 through FIG. 6 show other forms of rotating plates.
Figure 2:
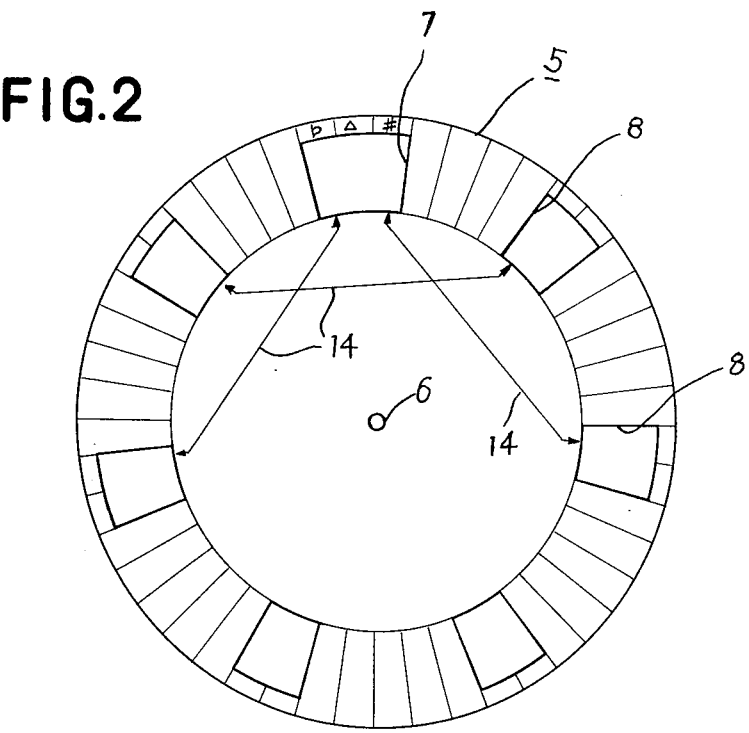
FIG. 2 is a front view of one example of rotating plate.

FIG. 2 shows a first rotative disc 5 to be used with basic disc 1. It is rotatably attached to the basic disc 1 at its center 6, e.g., by an eyelet, to cover the key name arrangement 4 of the disc 1, and provided with windows 7 and 8 to reveal major and minor keys separately by rotating the disc 5. Window 7 has three sectors width and windows 8 have two sectors width, and these windows are arranged to reveal key names every perfect fifth starting from center mark "△" of window 7. Therefore, when the center mark "△" of window 7 is set to "△" mark "C" of basic disc 1, all major keys appear in the windows 7 and 8 as shown in FIG. 3, and when the center mark if window 7 is set to "▲" mark "A" of basic disc 1, all minor keys appear in the windows.

Figure 4:
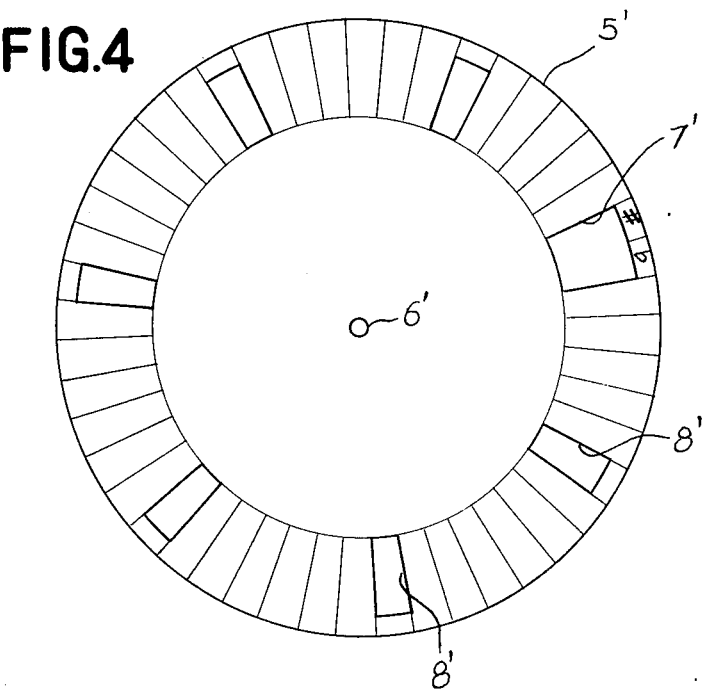

FIG. 4 shows another form of rotating plate 5', which is to be used by attaching its center 6' rotatably to disc 1.

When the mark "#" is set to basic note "C" or "A", keys of sharp key-signatures appear in windows 7' and 8', and when "♭" mark is set, keys of flat key-signatures appear in the windows.

Figure 5:
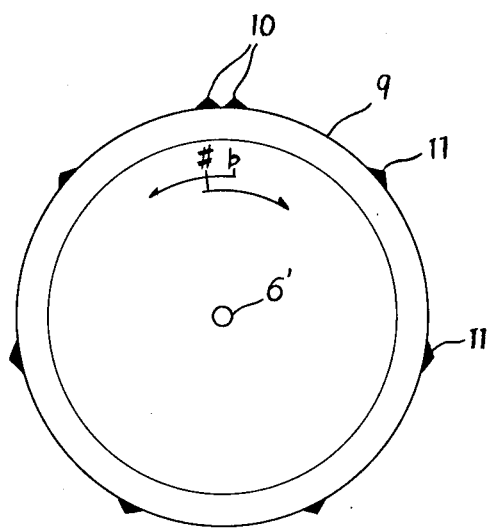

Rotating plate 9 in FIG. 5 is similar to plate 5' in FIG. 4, but is provided with arrow marks 10 and 11 instead of windows.

Figure 6:
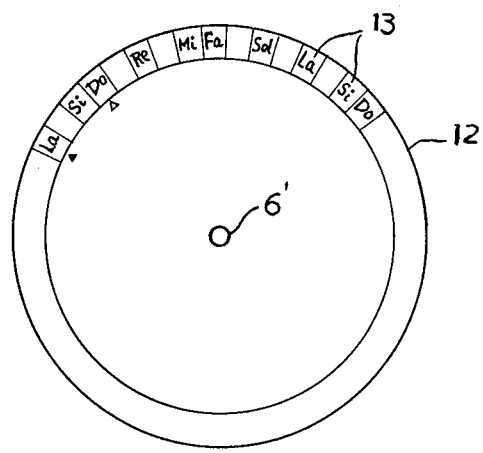

FIG. 6 shows a second rotative disc 12 which is rotatably attached to the basic disc 1 at its center 6' together with first rotative disc 5, that is, these discs are rotatable with respect to each other.

The diameter of disc 12 is smaller than that of window arrangement 7 and 8 of first rotative disc 5 and is provided with a corresponding do - re scale 13. By setting "Do" with the small "Δ" mark in case of major keys, the "La" with small "▲" mark in case of minor keys, to the key name appeared in the windows 7 and 8, the corresponding to do-re scale can be obtained with respect to the specific key. Further, by counting derivative notes marked "#♭" in the arrangement of scale 2 of basic disc 1 which correspond to letter notes of disc 12, the number of chromatic signs (which must coincide with the one in the key-signature 3 of disc 1) and the position thereof to be used in the stave may be obtained.

Correlation of keys can be obtained very easily by this device. For instance, dominant key of C major is G major having 1# key-signature, and subdominant key is F major having 1♭ key-signature.

Major and minor keys having the same key-signature are in the parallel key relationship, so that E minor and G major, both having 1# key-signature, and D minor and F major, both having 1♭ key-signature and parallel keys respectively. This can be obtained easily by rotating first rotative disc 5 slightly to reveal major and minor keys respectively.

First rotative disc 5 is also provided with lines 14. Each line connects windows spaced 12 notes, so that, is possible to indicate enharmonic keys. For instance, F sharp major and G flat major are enharmonic as shown in FIG. 3.

Figure 7:
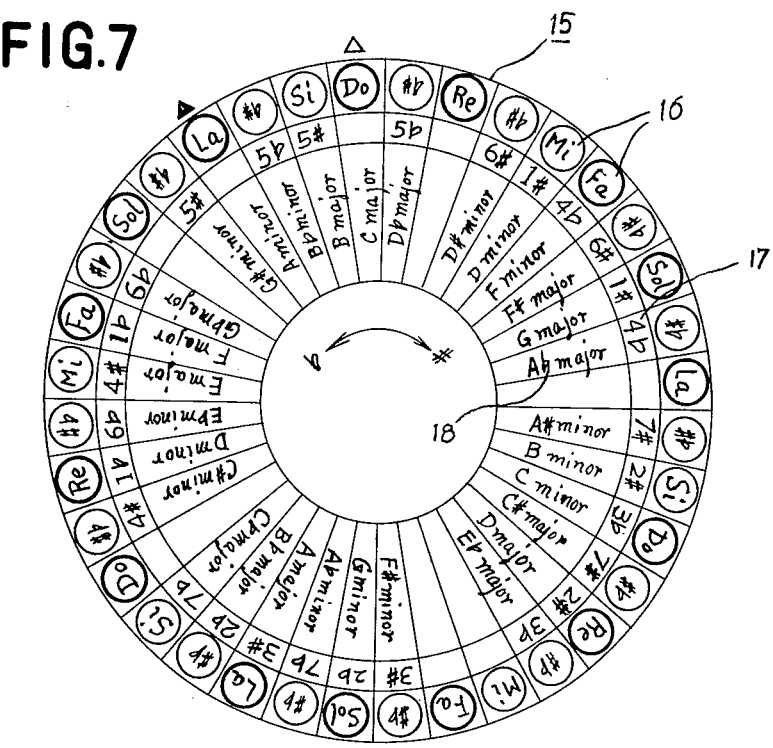
FIG. 7 is a front view of a table illustrating another embodiment of the present invention.

FIG. 7 shows another example of the disc 15, which is similar to disc 1, but three octave (36 notes) do-re scale 16 is provided. Key-signatures 17 and keys 18 are also provided similarly. In disc 15, the position of a key is one note shifted under the basic key, C major or A minor, when returned to the starting position, and keys with sharp and flat key-signatures are also in adjoining relationship. For instance, keys of "1#" and "4♭", or of "2#" and "3♭". Disc 15 may be used conveniently like disc 1.

Figure 8:
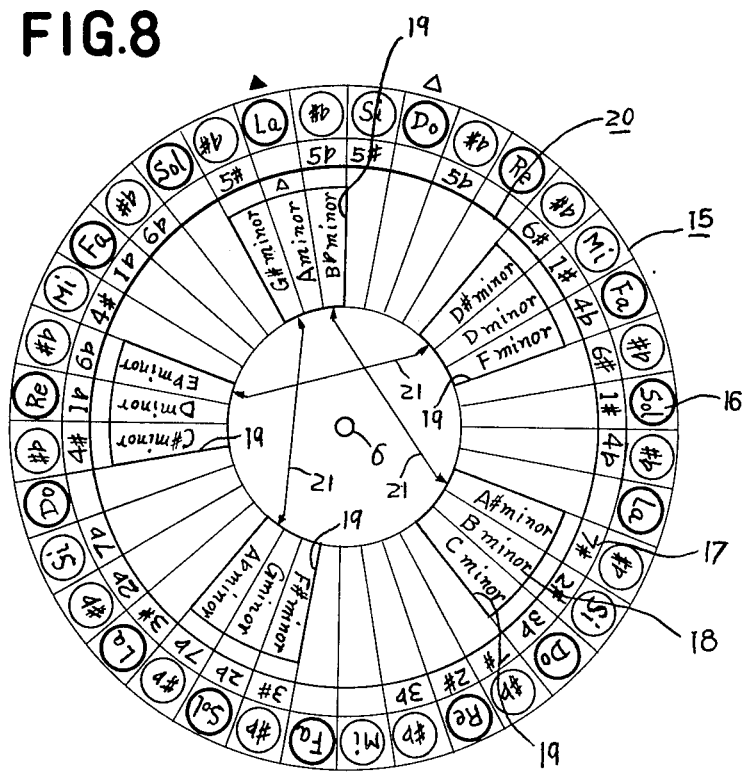
FIG. 8 is a front view of the table shown in FIG. 7 with a rotating plate similar to the one shown in FIG. 2.

FIG. 8 shows the disc 15 with rotating plate 20 which is similar to plate 5. Major and minor keys may be indicated in windows 19. The relationship of keys may be obtained also by this disc. Lines 21 of the plate indicate the enharmonic keys.

It is apparent from the foregoing description, that the device according to the present invention is able to indicate many fundamentals required for learning musical concepts despite being constructed in a compact form and very easy to use.

The embodiments of the invention in which an exclusive property or privilege is claimed are defined as follows:

1. A device for learning musical concepts comprising:
   a basic disc divided into 48 sectors, said sectors having therein indicia of musical notes to form a circular arrangement of four octave chromatic scales so that keys with sharp and flat key-signatures are in adjoining relationship,
   a second disc smaller in diameter than said first disc rotatably attached concentrically to said first disc provided with spaced apart windows to reveal selected portions of said first disc
   and a third disc rotatably attached concentrically to said first and second discs, said third disc having a diameter smaller than the window arrangement of said second disc and bearing indicia for a do-re scale.

2. The device of claim 1 wherein one of said discs has marking in a twelve note space relationship to indicate enharmonic keys.

* * * * *